UNITED STATES PATENT OFFICE.

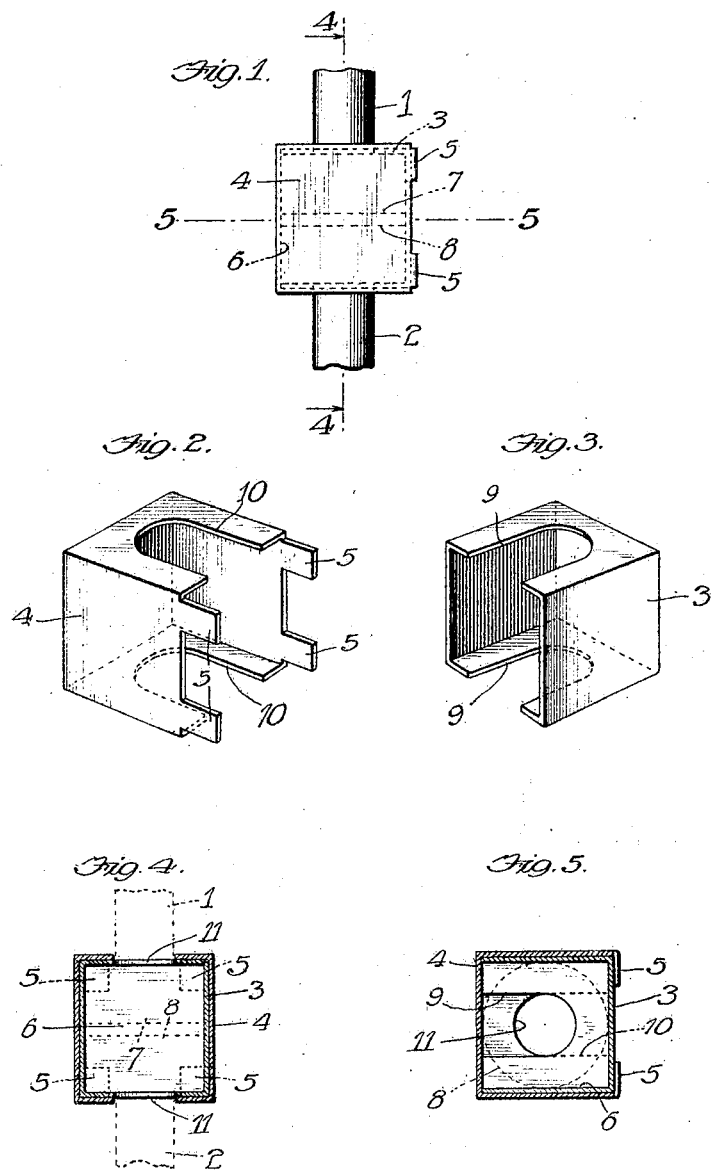

WALTER J. WELCH AND ATLEE H. TRACY, OF CHICAGO, ILLINOIS, ASSIGNORS TO H. M. BYLLESBY & COMPANY, OF CHICAGO, ILLINOIS, A CORPORATION OF DELAWARE.

COUPLING.

1,380,127.   Specification of Letters Patent.   Patented May 31, 1921.

Application filed September 1, 1920. Serial No. 407,294.

*To all whom it may concern:*

Be it known that we, WALTER J. WELCH and ATLEE H. TRACY, citizens of the United States, and residents of Chicago, in the county of Cook and State of Illinois, have invented a certain new and useful Improvement in Couplings, of which the following is a specification.

This invention relates to couplings and relates particularly to couplings especially designed and adapted for connecting sections of rod.

The object of the invention is to provide a coupling for the purpose specified, which will be effective for its designed purpose, simple, strong and durable and by means of which rods or sections of rods may be quickly and conveniently connected in the field by means of tools which are always readily available, as pliers and hammers.

To effect the object thereof, a rod coupling of our invention comprises hollow sections a side of each of which is open and the open side of one of which is adapted to telescope within the open side of the other and which, when assembled, form a chamber adapted to receive heads formed on the ends of the rod sections to be coupled, the overlapping end walls of said coupling members being provided with slots, which "cut out" at the edges of the open sides thereof and which, when the members of said coupling are assembled, define holes in the over-lapping ends thereof adapted to receive the connected rods directly beneath the heads formed on the connected ends thereof. Our invention also comprises means for securing said coupling members together in assembled position, said means preferably consisting of lugs formed on the edges of the open side of the outer coupling member adapted to be bent over the side wall of the inner coupling member exposed in the open side of said outer coupling member.

Our invention also comprises the various other features and details of construction hereinafter described and claimed.

In the accompanying drawings, in which our invention is fully illustrated,

Figure 1 is a side view of a coupling of our invention shown as applied in use for connecting two rod sections.

Figs. 2 and 3 are perspective views showing the members of said coupling separated and illustrating the manner of assembling the same.

Fig. 4 is a longitudinal sectional view on the line 4—4 of Fig. 1; and

Fig. 5 is a transverse sectional view thereof on the line 5—5 of Fig. 1.

In the drawings, a coupling of our invention is shown as applied in use for connecting two rod sections 1 and 2.

In accordance with our invention, our improved coupling comprises two hollow members 3 and 4, a side of each of which is open and the open side of one of which as shown of the member 3, is adapted to telescope into the open side of the other—the member 4, and which are adapted to be secured together in assembled positions by lugs 5 formed on the outer member 4 at the edges of the open side thereof and which are adapted to be bent over the exposed side of the inner member 3. To provide for bending the lugs 5 to secure the coupling members in assembled position, said coupling members are made of suitable strong but bendable material as brass or steel stampings.

Our improved coupling was especially designed for use in connection with the installation of electric transmission lines and is particularly advantageous for use in this connection, for the reason that it is frequently necessary to make couplings in the field where special tools are not available, and couplings of our invention can readily be made by means of a hammer and in many cases, pliers, both of which are always available.

The coupling members 3 and 4 are of such size and are so proportioned that, when assembled, they will form a chamber 6 of proper size to receive the heads 7 and 8 on the connected ends of the rods 1 and 2, the cross section of said chamber being slightly larger than the diameters of said heads and the dimensions thereof lengthwise of said rods being sufficiently greater than the combined or aggregate thickness of said heads to enable the same to be conveniently inserted therein, end to end.

To provide for assembling said coupling members upon the rods 1 and 2, with the heads 7 and 8 thereon in engagement with chamber 6, slots 9 and 10 are formed in the overlapping end walls of said coupling members, which "cut out" at the edges of the open sides thereof, respectively, the relation being such that when said coupling members are assembled said slots will define holes 11 in opposite ends of said coupling members to receive the rods 1 and 2 beneath the heads 7 and 8 thereon.

The end walls of the inner coupling member 3 adjacent to the inner end of the slot 10 therein, will form shoulders which will interlock with the heads 7 and 8 on the rods 1 and 2, thereby securely connecting said rods in the manner desired.

We claim,

1. A coupling for the purpose specified, comprising hollow coupling members a side of each of which is open, one of which telescopes into the other, the interior of said coupling members formng a chamber adapted to receive heads on the ends of the rod sections to be connected, the end walls of said coupling members being provided with slots which "cut out" at the open sides thereof and are adapted to receive the rods to be connected beneath the heads thereon, the relation being such that the heads on said rods will interlock with the end walls of the inner coupling member adjacent to the slot therein, substantially as described.

2. A coupling for the purpose specified, comprising hollow coupling members, a side of each of which is open, one of which telescopes into the other, the interior of said coupling members forming a chamber adapted to receive heads on the ends of the rod sections to be connected, the end walls of said coupling members being provided with slots which "cut out" at the open sides thereof and are adapted to receive the rods to be connected beneath the heads thereon, the relation being such that the heads on said rods will interlock with the end walls of the inner coupling member adjacent to the slot therein, and means for securing said coupling members in assembled position, substantially as described.

3. A coupling for the purpose specified, comprising hollow coupling members a side of each of which is open, one of which telescopes into the other, the interior of said coupling members forming a chamber adapted to receive heads on the ends of the rod sections to be connected, the end walls of said coupling members being provided with slots which "cut out" at the open sides thereof and are adapted to receive the rods to be connected beneath the heads thereon, the relation being such that the heads on said rods will interlock with the end walls of the inner coupling member adjacent to the slot therein and means for securing said coupling members in assembled position, consisting of interlocking parts thereon, substantially as described.

4. A coupling for the purpose specified, comprising hollow coupling members a side of each of which is open, one of which telescopes into the other, the interior of said coupling members forming a chamber adapted to receive heads on the ends of the rod sections to be connected, the end walls of said coupling members being provided with slots which "cut out" at the open sides thereof and are adapted to receive the rods to be connected beneath the heads thereon, the relation being such that the heads on said rods will interlock with the end walls of the inner coupling member adjacent to the slot therein and means for securing said coupling members in assembled position, consisting of lugs on the outer coupling member adapted to be bent over the exposed side of the inner coupling member, substantially as described.

In testimony, that we claim the foregoing as our invention, we affix our signatures this 25th day of August, 1920.

WALTER J. WELCH.
ATLEE H. TRACY.